United States Patent [19]

Grychtol et al.

[11] 4,264,494

[45] Apr. 28, 1981

[54] CHROMIUM COMPLEX DYESTUFFS FOR NATURAL POLYAMIDES AND SYNTHETIC NYLONS

[75] Inventors: Klaus Grychtol, Bad Durkheim; Hans Baumann, Wachenheim, both of Fed. Rep. of Germany

[73] Assignee: BASF Aktiengesellschaft, Ludwigshafen, Fed. Rep. of Germany

[21] Appl. No.: 930,201

[22] Filed: Aug. 2, 1978

[30] Foreign Application Priority Data

Aug. 5, 1977 [DE] Fed. Rep. of Germany ......... 273528

[51] Int. Cl.³ .................... C09B 45/06; C09B 45/16; C09B 55/00; C09B 56/02
[52] U.S. Cl. ......................... 260/146 R; 260/146 D; 260/147; 260/148; 260/149; 260/150; 260/151; 260/343.21; 260/438.5 R; 544/225; 546/5; 546/6; 546/7; 546/8; 546/9; 546/10; 548/103; 548/104; 548/105; 548/106; 548/107
[58] Field of Search .......... 260/145 A, 145 B, 146 R, 260/146 D, 147, 148, 149, 150, 151, 438.5 R; 548/103, 104, 105, 106, 107

[56] References Cited

U.S. PATENT DOCUMENTS

| | | | |
|---|---|---|---|
| 2,855,393 | 10/1958 | Schetty et al. | 260/145 A |
| 2,985,646 | 5/1961 | Schetty et al. | 260/145 A |
| 3,391,132 | 7/1968 | Beffa et al. | 260/145 A |
| 4,033,942 | 7/1977 | Beffa et al. | 260/145 A |
| 4,052,374 | 10/1977 | Baumann | 260/145 A |

FOREIGN PATENT DOCUMENTS

| | | | |
|---|---|---|---|
| 1079247 | 4/1960 | Fed. Rep. of Germany | 260/145 A |
| 1110348 | 7/1961 | Fed. Rep. of Germany | 260/145 A |
| 1544580 | 7/1970 | Fed. Rep. of Germany | 260/145 A |
| 2520526 | 11/1975 | Fed. Rep. of Germany | 260/145 A |
| 2620981 | 11/1976 | Fed. Rep. of Germany | 260/145 A |
| 2542707 | 3/1977 | Fed. Rep. of Germany | 260/145 B |

*Primary Examiner*—Floyd D. Higel
*Attorney, Agent, or Firm*—Oblon, Fisher, Spivak, McClelland & Maier

[57] ABSTRACT

Metal complex compounds which in the form of the free acids correspond to the formula I

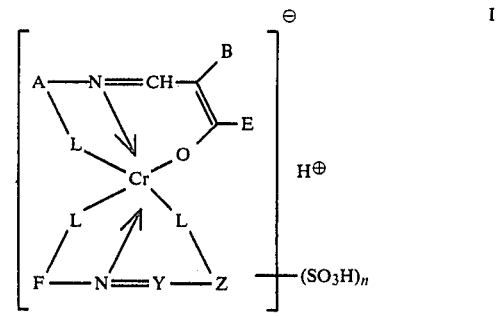

where A is an aliphatic, carbocyclic or heterocyclic radical, E is an aliphatic or carbocyclic radical, B is a cyano, acyl, substituted sulfonyl, carboxylic acid ester or carboxamide radical, or B and E together with the carbon atoms by which they are linked may be an alicyclic or heterocyclic radical, F is an aliphatic, carbocylic or heterocyclic radical, L is $-O-$, $-COO-$,

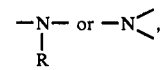

n is 1, 2, 3 or 4, Y is $=CH-$ or $=N-$ and Z is

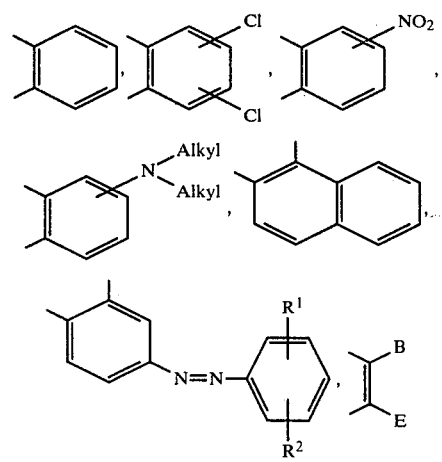

or the radical of a coupling component, alkyl being of 1 to 4 carbon atoms, and R is hydrogen or unsubstituted or substituted alkyl, cycloalkyl, aryl or acyl and $R^1$ and $R^2$ are substituents conventionally present in dyes.

The compounds of the formula I give fast dyeings on natural polyamides and synthetic nylons.

9 Claims, No Drawings

CHROMIUM COMPLEX DYESTUFFS FOR NATURAL POLYAMIDES AND SYNTHETIC NYLONS

BACKGROUND OF THE INVENTION

Field of the Invention:

The present invention relates to chromium complex dyes useful for dyeing natural polyamides and synthetic nylons.

SUMMARY OF THE INVENTION

The present invention relates to a metal complex compound which in the form of the free acid corresponds to the formula I

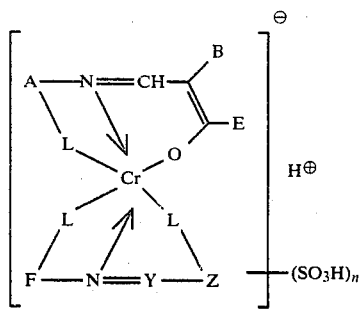

where

A is an aliphatic, carbocyclic or heterocyclic radical,

E is an aliphatic or carbocyclic radical,

B is a cyano, acyl, substituted sulfonyl, acid), carboxylic acid ester or carboxamide radical, or B and E together with the carbon atoms by which they are linked may be an alicyclic or heterocyclic radical, F is an aliphatic, carbocyclic or heterocyclic radical, the L's independently of one another are —O—, —COO—,

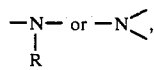

n is 1, 2, 3 or 4,

Y is =CH— or =N— and

Z is

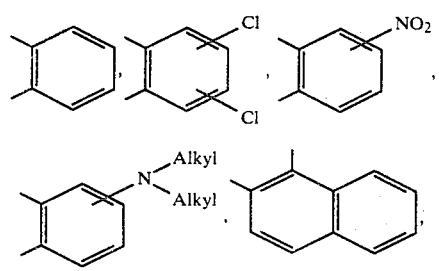

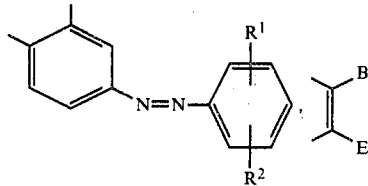

or the radical of a coupling component, alkyl being of 1 to 4 carbon atoms, and

R is hydrogen or unsubstituted or substituted alkyl, cycloalkyl, aryl or acyl and $R^1$ and $R^2$ have the meanings given below.

DESCRIPTION OF THE PREFERRED EMBODIMENTS

Radicals A in particular correspond to the formula

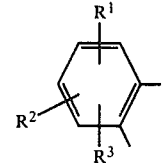

or —$(CH_2)_n$— where $R^1$ is hydrogen, chlorine, bromine, nitro, hydroxysulfonyl, aminosulfonyl, alkylaminosulfonyl, where alkyl is of 1 to 4 carbon atoms, dialkylaminosulfonyl, where alkyl is of 1 to 4 carbon atoms, methyl, ethyl, methoxy or ethoxy, $R^2$ is hydrogen, chlorine or methyl, or $R^1$ and $R^2$ together may be a fused benzo-ring which is unsubstituted or substituted by hydroxysulfonyl, chlorine or nitro and $R^3$ is hydrogen or hydroxysulfonyl, and n has the stated meaning.

Specific examples of compounds of the formula

or of the formula

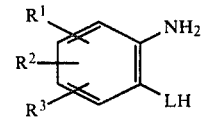

or $H_2N(CH_2)_n$-LH are anthranilic acid, 4- and 5-sulfoanthranilic acid, 2-aminophenol, 4-chloro-2-aminophenol, 4- and 5-nitro-2-aminophenol, 4,6-dichloro-2-aminophenol, 4-methyl-6-nitro-2-aminophenol, 4-chloro-5-nitro-2-aminophenol, 4-nitro-2-aminobenzoic acid, 2-aminophenol-4-sulfonic acid, 2-aminophenol-4-sulfonamide, 2-aminophenol-4-sulfonic acid phenylamide, 2-aminophenol-5-sulfonic acid dimethylamide, 2-aminophenol-4-sulfonic acid γ-methoxypropylamide, 4-chloro-2-aminophenol-6-sulfonic acid, 4-nitro-2-aminophenol-6-sulfonic acid, 5- and 6-nitro-2-aminophenol-4-sulfonic acid, 1-amino-2-naphthol-4-sulfonic acid, 2-amino-1-naphthol-5-sulfonic acid, 1-amino-6-nitro-2-naphthol-4-sulfonic acid, 5-anthranisulfonic acid monomethylamide, aminoethanol, 1-aminopropan-2-ol, 1-aminopropan-3-ol, 3-amino-3-methyl-butan-1-ol, o-aminobenzyl alcohol, aminoacetic acid, 2-aminopropionic acid, 3-aminopropionic acid, 2-amino-3-hydroxypropionic acid, 2-amino-3-phenylpropionic acid, 2-aminobutyric acid, aminosuccinic acid, aminoglutaric acid, ethylenediamine, 1,2-diaminopropane, 1-methylamino-2-aminoethane, 1-phenylamino-2-aminoethane, 1-cyclohexylamino-3-aminopropane, 1-phenylamino-2-aminopropane, 1-phenylamino-3-aminopropane, 1-(4'-methylphenylamino)-3-aminopropane, 1-(4'-chlorophenylamino)-3-aminopropane, 1-phenylamino-3-aminopropane-4'-sulfonic acid, 1-hydroxyethylamino-2-aminoethane, 2-aminocyclopentylamine, 1,2-diaminocyclohexane, 1-amino-2-(2'-benzimidazolyl)-ethane, 1-amino-3-(2'-benzimidazolyl)-propane, 1-amino-4-(2'-benzimidazolyl)-butane and 2-hydrazinobenzthiazole.

Preferred radicals E are methyl and phenyl. Examples of radicals B, in addition to cyano, are acetyl, benzoyl, methylsulfonyl, ethylsulfonyl, phenylsulfonyl, alkoxycarbonyl, where alkoxy is of 1 to 4 carbon atoms, eg. methoxycarbonyl, ethoxycarbonyl, propoxycarbonyl and butoxycarbonyl, and the radicals of the formulae $CONHCH_2C_6H_5$, $CONHC_6H_5$, $CONHC_6H_4Cl$, $CONCH_6H_3Cl_2$, $CONHC_6H_4CH_3$, $CONHC_6H_4OCH_3$, $CONHC_6H_4Br$, $CONHC_6H_3(CH_3)_2$, $CONHC_6H_3(OCH_3)_2$, $CONHC_6H_2(OCH_3)_2CH_3$, $CONHC_6H_3ClCH_3$, $CONHC_6H_4SO_3H$, $CONHC_6H_3ClSO_3H$, $CONHC_6H_4SO_2NHCH_3$ and $CONHSO_2C_6H_5$.

Specific examples of compounds of the formula

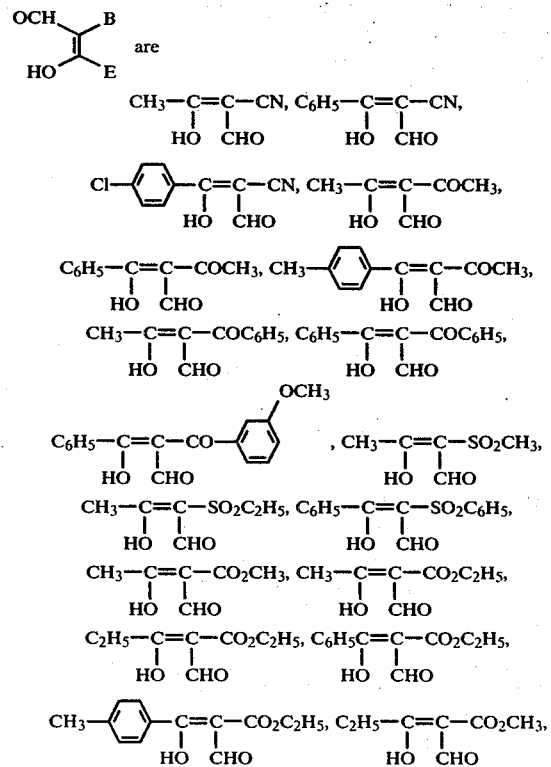

-continued

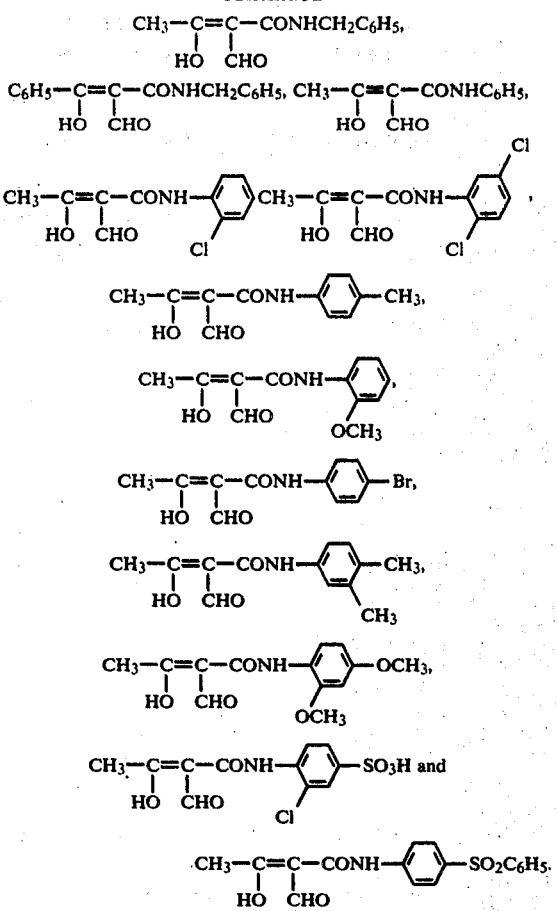

Examples of compounds in which the radicals B and E form part of a ring, and which correspond to the formula

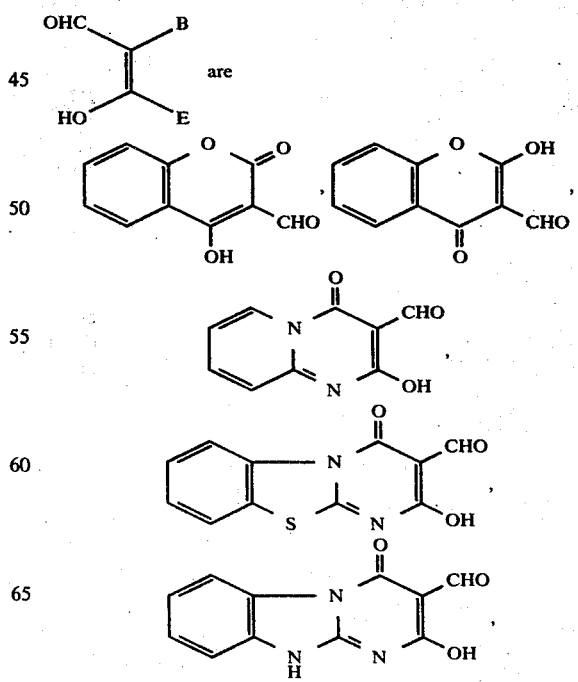

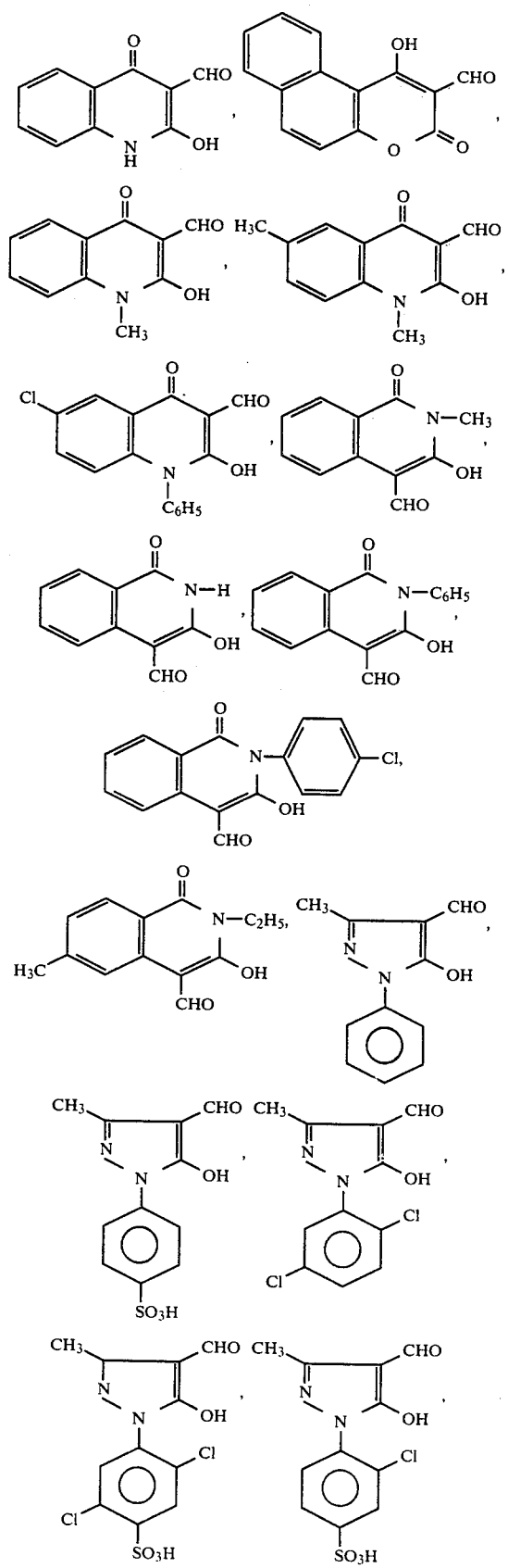
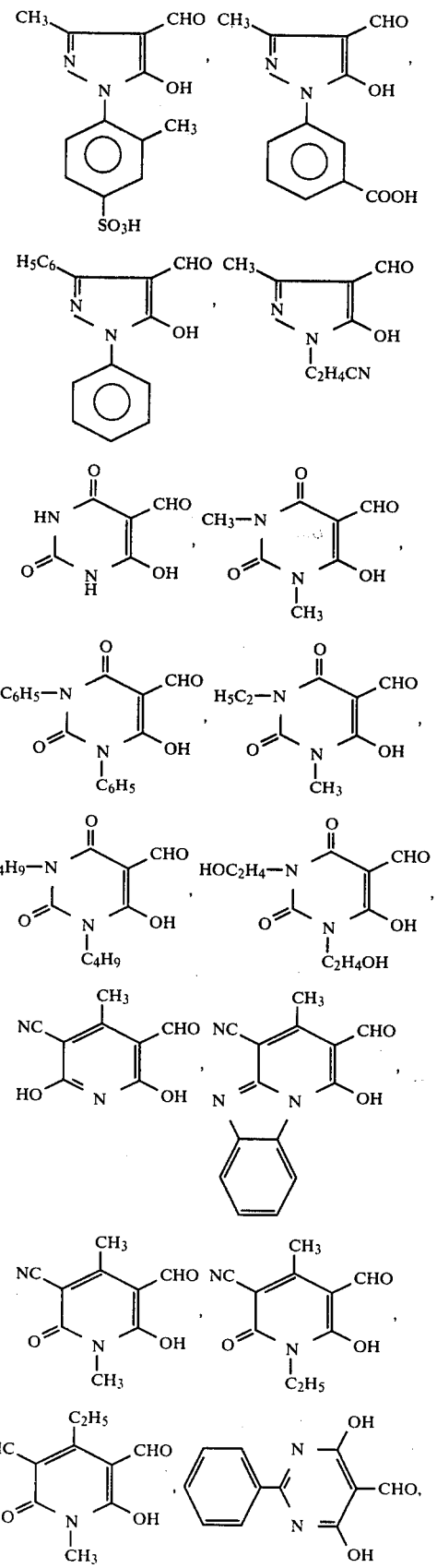

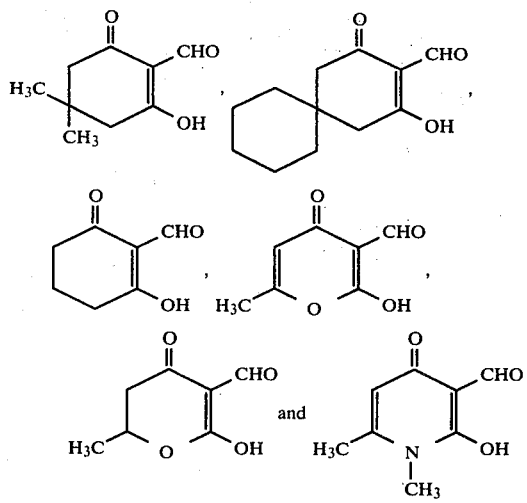

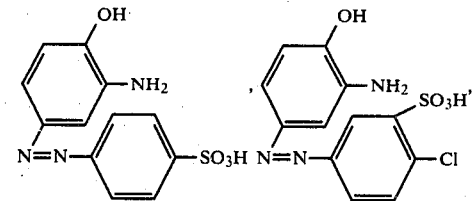

The radicals F either correspond to the radicals A or are radicals of a diazo component of the benzene or naphthalene series, which have the formula II

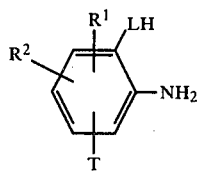

where T is hydrogen, chlorine, bromine, nitro or hydroxysulfonyl, or is phenylazo which is unsubstituted or substituted by chlorine, bromine, methyl, methoxy, hydroxyl or hydroxysulfonyl, and $R^1$, $R^2$ and L have the stated meanings.

Specific examples of compounds of the formula II are the compounds of the formula

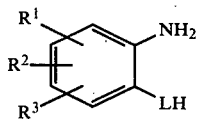

mentioned in explaining the meaning of A, as well as the following compounds

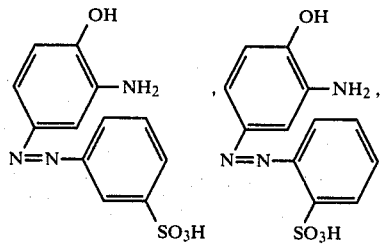

In L, examples of radicals R present on $$-\underset{|}{N}-$$

are, in addition to hydrogen, alkyl of 1 to 6 carbon atoms, hydroxyethyl, hydroxypropyl, alkoxyethyl and alkoxypropyl, where alkoxy is of 2 to 4 carbon atoms, phenoxyethyl and phenoxypropyl, alkanoyloxyethyl and alkanoyloxypropyl, where alkanoyl is of 2 to 4 carbon atoms, benzoyloxyethyl and benzoyloxypropyl, phenylsulfonyloxyethyl and phenylsulfonyloxypropyl, tolylsulfonyloxyethyl and tolylsulfonyloxypropyl, cyclohexyl, benzyl or phenylethyl, or phenyl which is unsubstituted or substituted by chlorine, bromine, methyl, ethyl, methoxy, ethoxy or hydroxysulfonyl.

Examples of preferred radicals R are alkyl of 1 to 4 carbon atoms, β-hydroxyethyl, β-hydroxypropyl, methoxyethyl, phenylsulfonyloxyethyl, tolylsulfonyloxyethyl and cyclohexyl, and phenyl which is unsubstituted or substituted by chlorine, methyl, methoxy or hydroxysulfonyl.

Examples of radicals Z in the coupling component are radicals of the formulae

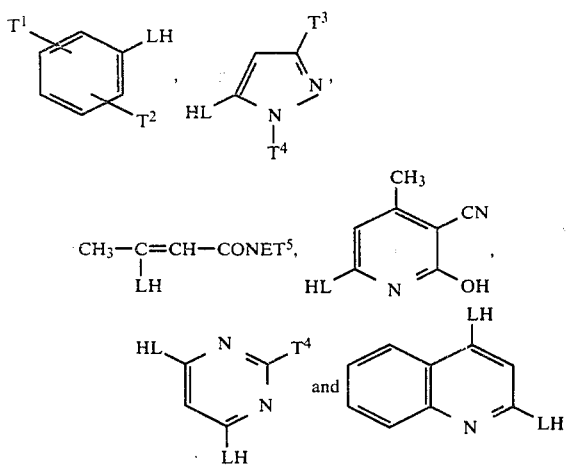

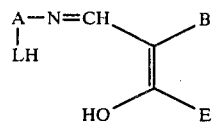

where
T¹ is hydrogen, methyl, methoxy or ethoxy,
T² is hydrogen or methyl, or
T¹ and T² together are a fused benzo-ring which is unsubstituted or substituted by hydroxysulfonyl, amino or hydroxyl,
T³ is methyl, alkoxycarbonyl, where alkoxy is of 1 to 4 carbon atoms, or carbamyl,
T⁴ is methyl or is phenyl which is unsubstituted or substituted by methyl, chlorine or hydroxysulfonyl and
T⁵ is benzyl or is phenyl which is unsubstituted or substituted by chlorine, bromine, methyl, ethyl, methoxy, ethoxy, hydroxysulfonyl or carbamyl.

Specific examples of coupling components are 4-methylphenol, 3,4-dimethylphenol, 4-acetylaminophenol, 4-methyl-3-acetylaminophenol, 4-methoxyphenol, 3-diethylaminophenol, 4-methyl-3-ethylaminophenol, 3-(o-tolylamino)phenol, 2-naphthylamine, 2-naphthol, 6-bromo-2-naphthol, 8-acetylamino-2-naphthol, 5,8-dichloro-1-naphthol, 1-naphthol-5-sulfonic acid, 2-naphthol-6-sulfonic acid, 1-naphthylamine-4- and -5-sulfonic acid, 2-naphthylamine-5- and -6-sulfonic acid, 8-acetylamino-1-naphthol-5-sulfonic acid, 6-phenylamino-1-naphthol-3-sulfonic acid, 7-amino-1-naphthol-3-sulfonic acid, 1-methyl-5-pyrazolone, 1-phenyl-3-methyl-5-pyrazolone, 1-phenyl-5-aminopyrazole, 1,3-diphenyl-5-pyrazolone, 1-phenyl-5-pyrazolone-3-carboxylic acid, 1-(2'-methylphenyl)-3-methyl-5-pyrazolone, 1-(4'-chlorophenyl)-3-methyl-5-pyrazolone, 1-(2',5'-dichlorophenyl)-3-methyl-5-pyrazolone, 1-phenyl-3-methyl-5-pyrazolone-4'-carboxyic acid, 1-phenyl-3-methyl-5-pyrazolone-3'- and -4'-sulfonic acid, 1,3-diphenyl-5-pyrazolone-2'-sulfonic acid, 1-(2'-chlorophenyl)-3-methyl-5-pyrazolone-5'-sulfonic acid, 1-(2',5'-dichlorophenyl)-3-methyl-5-pyrazolone-4'-sulfonic acid, 2,4-dihydroxyquinoline, N-acetoacetylphenylamide, N-acetoacetylcyclohexylamide, N-acetoacetyl-(4-methylphenyl)-2-sulfonic acid, 2,4-dihydroxyquinoline, 2,6-dihydroxy-3-cyano-4-methylpyridine, 2-phenyl-4,6-dihydroxypyrimidine and 2-methyl-4,6-dihydroxypyrimidine.

The dye of the formula I may be prepared by causing a compound of the formula III

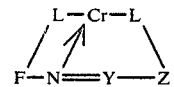

to undergo adduct formation with a 1:1 Cr-complex of the formula

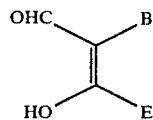

or, in the case of a symmetrical 1:2 complex, by chroming a compound of the formula III.

The reactions are known in principle and, under similar conditions, take place in a similar manner to conventional reactions. Details of the methods of preparation may be found in the Examples, where parts and percentages are by weight, unless stated otherwise.

The aldehydes of the formula $$\begin{array}{c} OHC \diagdown \diagup B \\ \| \\ HO \diagup \diagdown E \end{array}$$

required to prepare the compounds of the formula III are known in some cases; alternatively, they may be prepared by conventional methods, eg. by a Vilsmeier reaction.

The 1:2 chromium complex dyes of the general formula I may be used for dyeing and printing natural or synthetic nitrogen-containing materials, eg. wool, leather, nylon fibers and polyurethane fibers. The dyeings obtained are distinguished by great fastness, in particular good lightfastness and wetfastness, eg. fastness to washing, milling, perspiration and potting.

Dyes of particular importance are those of the formula Ia

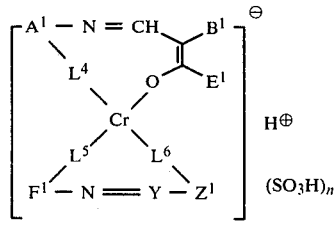

where

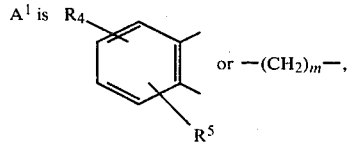

m is 1, 2 or 3,
R⁴ is hydrogen, chlorine, nitro, methyl or hydroxysulfonyl,
R⁵ is hydrogen or chlorine,

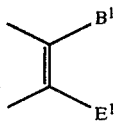

or the radical of acetylacetone, of an acetoacetanilide which is unsubstituted or substituted by chlorine, methyl, methoxy or hydroxysulfonyl, of a 1-phenyl-3-methylpyrazol-5-one which is unsubstituted or substituted in the phenyl ring by chlorine, methyl or hydroxysulfonyl, of a barbituric acid which is unsubstituted or is monosubstituted or disubstituted by alkyl of 1 to 4 carbon atoms or by phenyl, or of a 2,4-dihydroxyquinoline which is unsubstituted or substituted at the nitrogen by alkyl of 1 to 4 carbon atoms, $F^1$ is a carbocyclic radical,
$L^4$ is as defined for $L^1$ in connection with formula (I).
$L^5$ is —O— or —CO—,
$L^6$ is —O— or —NH— and
$Z^1$ is

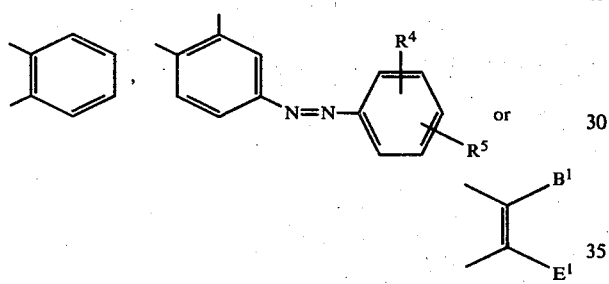

or is the radical of a coupling component of the naphthol, naphthylamine, pyrazolone or acetoacetanilide series and N and Y are each as defined above for formula (I).

Preferred coupling component radicals $Z^1$ are radicals of naphthols and naphthylamines which are unsubstituted or substituted by hydroxysulfonyl, and -radicals of the pyrazolone and acetoacetanilide derivatives listed under the formula

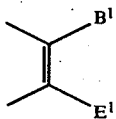

Dyes of particular industrial importance are those which in the form of the free acid correspond to the formula

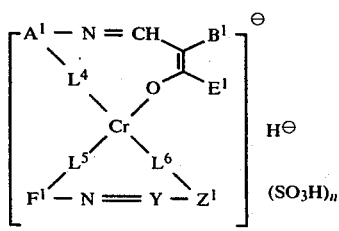

where $A^1$ is

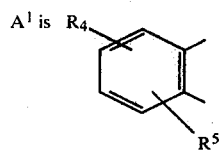

or —(CH$_2$)$_m$—,
m is 1, 2 or 3,
$R^4$ is hydrogen, chlorine, nitro, methyl or hydroxysulfonyl,
$R^5$ is hydrogen or chlorine,

or the radical of acetylacetone, of an acetoacetoanilide which is unsubstituted or substituted in the phenyl ring by chlorine, methyl, methoxy or hydroxysulfonyl, of a 1-phenyl-3-methylpyrazol-5-one which is unsubstituted or substituted in the phenyl ring by chlorine, methyl or hydroxysulfonyl, of a barbituric acid which is N-unsubstituted or is N-monosubstituted or N,N'-disubstituted by alkyl of 1 to 4 carbon atoms or by phenyl, or of a 2,4-dihydroxyquinoline which is unsubstituted or substituted at the nitrogen by alkyl of 1 to 4 carbon atoms, $F^1$ is

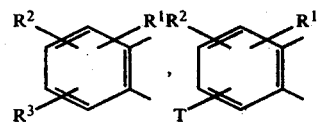

or —(CH$_2$)$_n$—

$R^1$ is hydrogen, chlorine, bromine, nitro, hydroxysulfonyl, aminosulfonyl, alkylaminosulfonyl, where alkyl is of 1 to 4 carbon atoms, dialkylaminosulfonyl, where alkyl is of 1 to 4 carbon atoms, methyl, ethyl, methoxy or ethoxy, $R^2$ is hydrogen, chlorine or methyl, or $R^1$ and $R^2$ together may be a fused benzo-ring which is unsubstituted or substituted by hydroxysulfonyl, chlorine or nitro, $R^3$ is hydrogen or hydroxysulfonyl, n is 1, 2, 3 or 4, T is hydrogen, chlorine, bromine, nitro, hydroxysulfonyl or phenylazo which is unsubstituted or substituted by chlorine, bromine, methyl, methoxy, hydroxyl or hydroxysulfonyl, $L^4$ is —O—, —COO— or

$L^5$ is —O— or —COO—,
$L^6$ is —O— or —NH—,
$Z^1$ is a radical of the formula

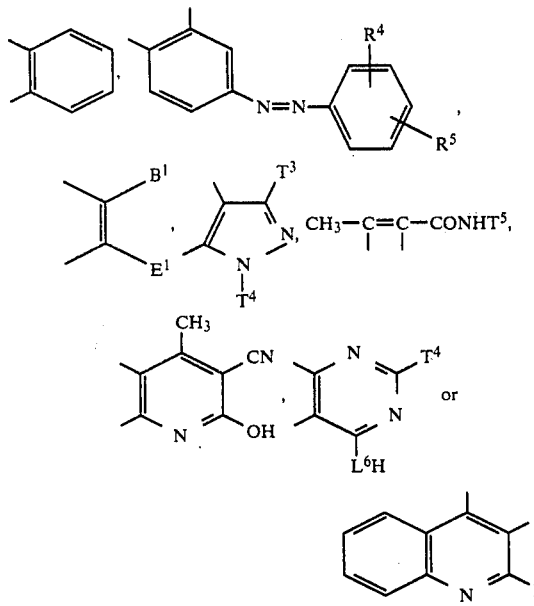

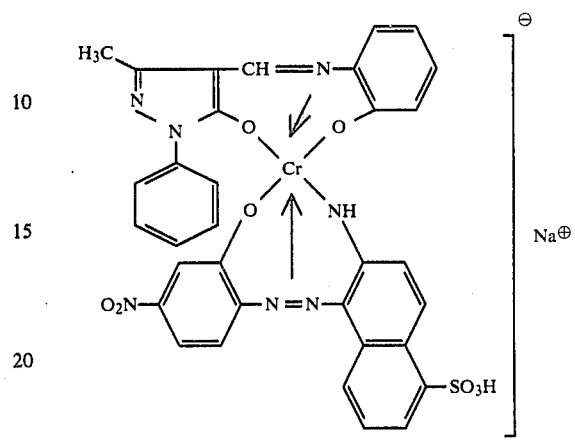

T¹ is hydrogen, methyl, methoxy or ethoxy,

T² is hydrogen or methyl, or

T¹ and T² together are a fused benzo-ring which is unsubstituted or substituted by hydroxysulfonyl, amino or hydroxyl, T³ is methyl, alkoxycarbonyl of 1 to 4 carbon atoms or carbamyl, T⁴ is methyl or is phenyl which is unsubstituted or substituted by methyl, chlorine or hydroxysulfonyl, T⁵ is benzyl or is phenyl which is unsubstituted or substituted by chlorine, bromine, methyl, ethyl, methoxy, ethoxy, hydroxysulfonyl or carbamyl, Y is =CH— or =N— and R is hydrogen, alkyl of 1 to 6 carbon atoms, hydroxyethyl, hydroxypropyl, alkoxyethyl or alkoxypropyl, where alkoxy is of 2 to 4 carbon atoms, phenoxyethyl or phenoxypropyl, alkanoyloxyethyl or alkanoyloxypropyl, where alkanoyl is of 2 to 4 carbon atoms, benzoyloxyethyl or benzoyloxypropyl, phenylsulfonyloxyethyl or phenylsulfonyloxypropyl, tolylsulfonyloxyethyl or tolylsulfonyloxypropyl, cyclohexyl, benzyl or phenylethyl, or is phenyl which is unsubstituted or substituted by chlorine, bromine, methyl, ethyl, methoxy, ethoxy or hydroxysulfonyl.

EXAMPLE 1

14 parts of the phenylimine of 4-formyl-1-phenyl-3-methylpyrazol-5-one in 200 parts of water are stirred with 5.5 parts of o-aminophenol for 30 minutes at pH 8–9 and 80° C. 25 parts of the 1:1 chromium complex dye based on the azo dye obtained from 1-amino-2-hydroxy-4-nitrobenzene and 2-naphthylamine-5-sulfonic acid are added. The mixture is then stirred for 6 hours at 80° C. whilst maintaining the pH at 8–9. The dye is precipitated by adding sodium chloride solution, and after drying 35 parts of a readily water-soluble powder are obtained. Green dyeings of good lightfastness are obtained on wool and nylon.

Dyes which are also green and have very good wetfastness and lightfastness are obtained when o-aminophenol is replaced by the following ligands: aminoethanol, anthranilic acid, aminoacetic acid, ethylenediamine, N-phenylethylenediamine, N-phenyl-1,3-propylenediamine, 1-amino-2-hydroxy-naphthalene-4-sulfonic acid, 1-amino-2-hydroxybenzenesulfonic acid monomethylamide and 4-chloro-2-aminophenol-6-sulfonic acid.

The following dyes are obtained by a similar method:

-continued

| Azomethine | 1:1 chromium complex | Hue |
|---|---|---|
| " | [structure: HO₃S, OH, HO, N=N, pyrazole with N-phenyl, CH₃, O₂N substituent] | orange |
| " | [structure: HO₃S, OH, HO, N=N, pyrazole with N-C₆H₄-SO₃H, CH₃, Cl substituent] | red |
| " | [structure: HO₃S, OH, HO, N=CH-phenol, NO₂ substituent] | yellow |
| " | [structure: HO₃S-naphthol, N=N, naphthol, NO₂ substituent] | green |
| [structure: CH₃-pyrazolone with N-C₆H₅, CH=N-C₂H₄-OH] | [structure: HO₃S-naphthol, OH, HO, N=N, pyrazole with N-C₆H₄-SO₃H, H₃C] | red |
| " | [structure: HO₃S-naphthol, OH, HO, N=N, naphthol, NO₂ substituent] | greyish blue |
| [structure: CH₃-pyrazolone with N-C₆H₅, CH=N-CH₂-COOH] | " | greyish blue |
| [structure: CH₃-pyrazolone with N-C₆H₅, CH=N-C₂H₄-NH₂] | " | greyish blue |
| [structure: CH₃-pyrazolone with N-C₆H₅, CH=N-NH-benzothiazole] | [structure: O₂N-phenol, OH, H₂N, N=N, naphthalene-SO₃H] | green |
| [structure: CH₃-pyrazolone with N-C₆H₅, CH=N-o-hydroxyphenyl] | [structure: HO₃S, OH, HO, CH₃, N=N, C(=O)NHC₆H₅, NO₂ substituent] | yellow |

EXAMPLE 2

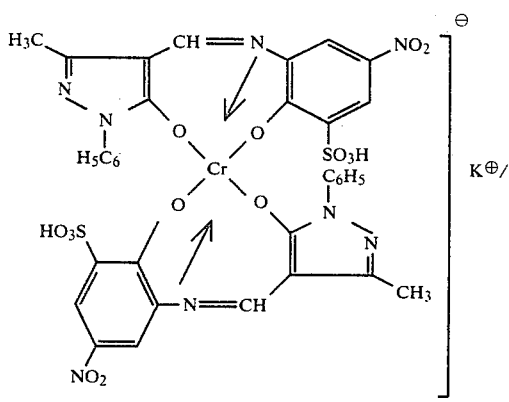

28 parts of the phenylamine of 4-formyl-1-phenyl-3-methylpyrazol-5-one are stirred with 20 parts of sodium acetate and 23.4 parts of 1-amino 2-hydroxy-5-nitrobenzene-3-sulfonic acid in 300 parts of water at 80° C. A solution of 13.3 parts of chromium chloride in water is added and the mixture is boiled until the thin layer chromatogram indicates complete conversion. The dye is isolated by adding NaCl/KCl. It gives yellow very lightfast dyeings on wool and nylon.

EXAMPLE 3

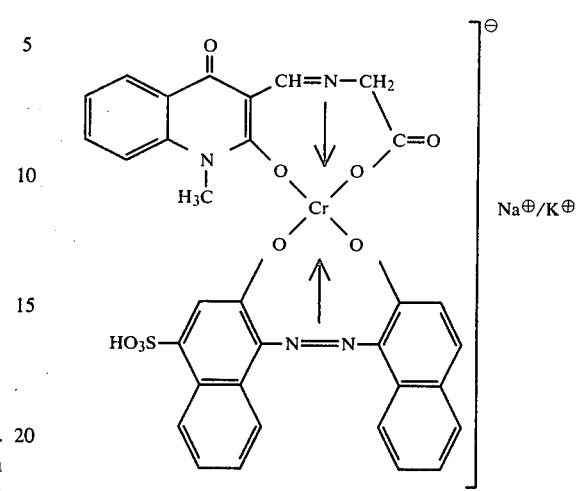

14 parts of N-methyl-2,4-dihydroxyquinoline-3-formylphenylimine in 200 parts of water and 100 parts of ethanol are stirred at pH 8–9 and 80° C. When all has dissolved, 4 parts of aminoacetic acid are added followed by 19 parts of the 1:1 chromium complex of the azo dye obtained from 1-amino-2-naphthol-4-sulfonic acid and β-naphthol. The mixture is stirred for 4 hours at 80° C. and the product is precipitated by adding NaCl/KCl solution. Yield 36 g. The dye gives blue dyeings, of good fastness, on wool and nylon.

The following dyes are obtained by a similar method:

| Azomethine | 1:1 chromium complex | Hue |
|---|---|---|
| (N-methyl-2,4-dihydroxyquinoline-3-CH=N-CH(COOH)) | (2-hydroxy-4-nitrophenyl azo 3-amino-naphthalene sulfonic acid) | green |
| " | (naphthol-sulfonic acid azo naphthol-sulfonic acid) | blue |
| (N-methyl-2,4-dihydroxyquinoline-3-CH=N-CH₂-CO₂H) | (naphthol-sulfonic acid azo pyrazolone-phenyl-SO₃H) | red |

-continued
| Azomethine | 1:1 chromium complex | Hue |
|---|---|---|
| " | 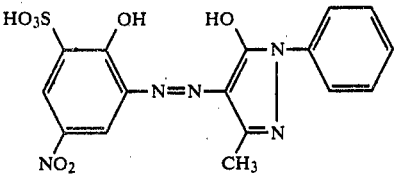 | orange |
| " | 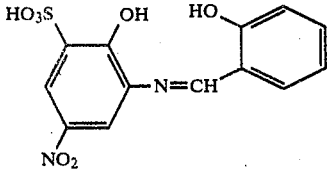 | yellow |
| 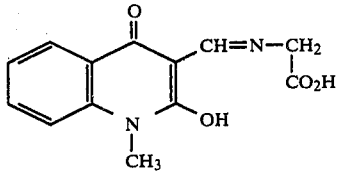 | 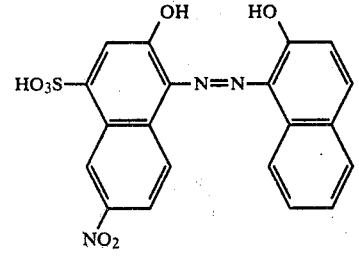 | grey |
| 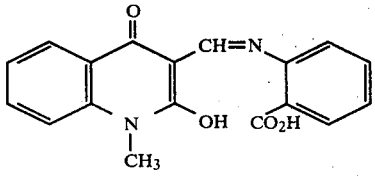 | 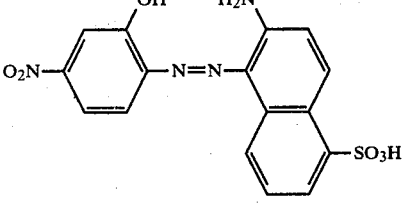 | green |
| " | 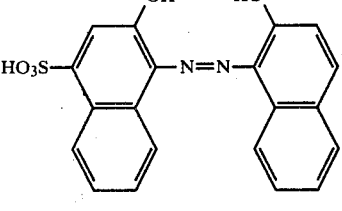 | blue |
| " | 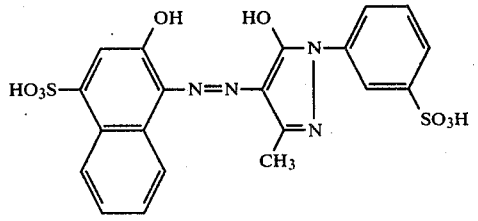 | red |
| " | 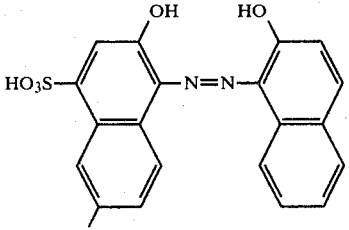 | grey |

-continued
| Azomethine | 1:1 chromium complex | Hue |
|---|---|---|
| 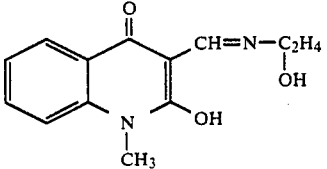 | 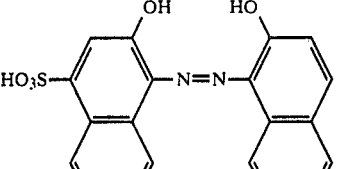 | blue |
| | 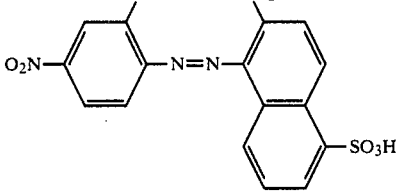 | green |
| 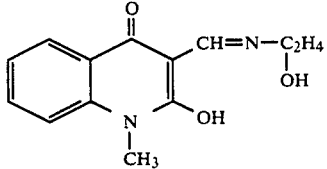 | 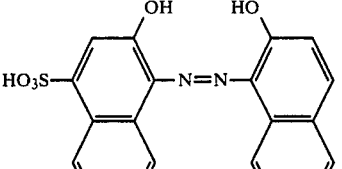 | greyish blue |
| " | 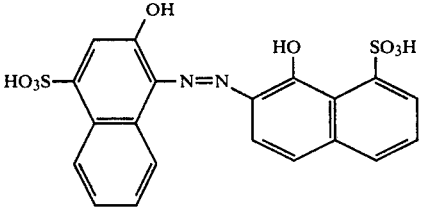 | blue |
| " | 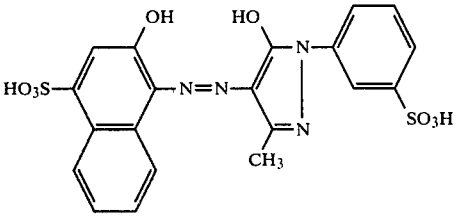 | red |
| " | 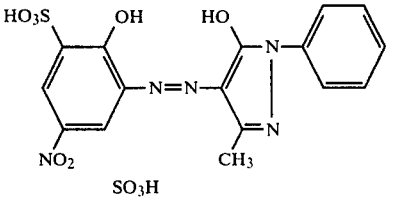 | orange |
| " | 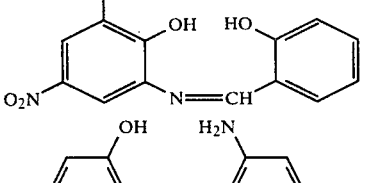 | yellow |
| 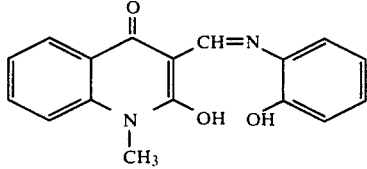 | 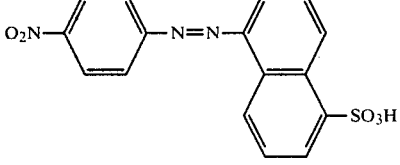 | green |

-continued

| Azomethine | 1:1 chromium complex | Hue |
|---|---|---|
| " | [structure: bis-naphthyl azo with OH, OH, HO3S] | dark brown |
| " | [structure: naphthyl-azo-naphthyl with OH, HO3S, SO3H] | greyish green |
| [structure: quinolone with CH=N-phenyl-OH, N-CH3] | [structure: naphthyl-azo-pyrazolone with HO3S, SO3H, CH3] | red |
| " | [structure: bis-naphthyl azo with OH, HO3S, NO2] | dark brown |
| " | [structure: chlorophenyl-azo-pyrazolone with HO3S, SO3H, CH3, Cl] | red |
| " | [structure: nitrophenyl-azo-pyrazolone with HO3S, CH3, O2N, phenyl] | orange |
| " | [structure: nitro-sulfo-phenyl-N=CH-hydroxyphenyl with HO3S, O2N] | yellow |

-continued

| Azomethine | 1:1 chromium complex | Hue |
|---|---|---|
| " | [structure: 3-hydroxy-4-sulfonaphthalene azo pyrazolone with phenyl-SO₃H] | red |
| " | [structure: hydroxy-sulfo-nitronaphthalene azo hydroxynaphthalene] | dark brown |
| " | [structure: sulfo-hydroxy-nitrobenzene azo phenyl-methyl-pyrazolone] | orange |
| " | [structure: hydroxy-sulfonaphthalene azo hydroxy-sulfonaphthalene] | blue |
| " | [structure: sulfo-hydroxy-nitrobenzene =CH- hydroxyphenyl] | yellow |
| " | [structure: sulfo-hydroxy-nitrobenzene azo CH₃-C=C-CONHC₆H₅ with OH] | yellow |

EXAMPLE 6

| Azomethine | 1:1 chromium complex | Hue |
|---|---|---|
| 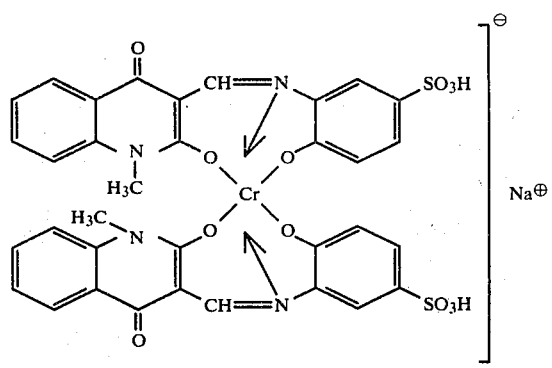 | 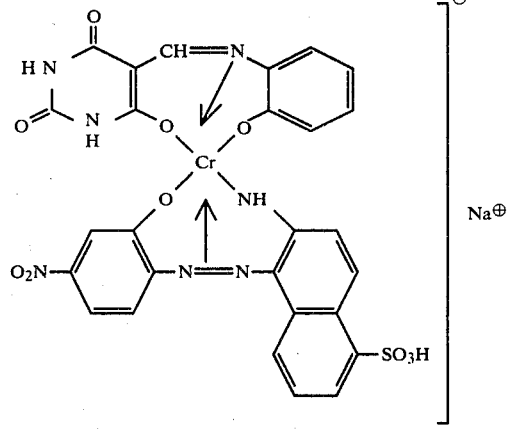 | red |

EXAMPLE 4

14 parts of N-methyl-2,4-dihydroxyquinoline-3-formyl-phenylimine are dissolved in ethanol/water at pH 9 and 80° C. 9.5 parts of 2-amino-phenol-4-sulfonic acid, 20 parts of sodium acetate and 13.3 parts of chromium-(III) chloride hexahydrate are added and the mixture is refluxed for 3 hours, after which it is concentrated under reduced pressure. 46 parts of a dye which gives yellow dyeings on wool and nylon are obtained.

EXAMPLE 5

11.6 parts of

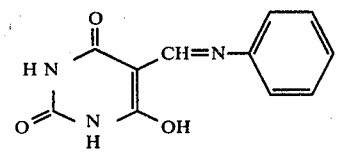

and 5.5 parts of o-aminophenol are dissolved in an ethanol/water mixture at pH 9.5–10 and 80° C. On adding 22.5 parts of the 1:1 chromium complex of the azo dye obtained from 1-amino-2-hydroxy-4-nitrobenzene and 2-amino-naphthalene-5-sulfonic acid and stirring at 80° C., whilst keeping the pH at 9.5 by adding sodium hydroxide solution, the 1:2 complex dye is obtained; it is isolated by salting out. Yield, 49 parts. The dye gives a green hue on wool and nylon.

The dyes shown in the Table below were obtained by a similar method:

| Azomethine | 1:1 chromium complex | Hue |
|---|---|---|
| | | greyish blue |

| Azomethine | 1:1 chromium complex | Hue |
|---|---|---|
| | 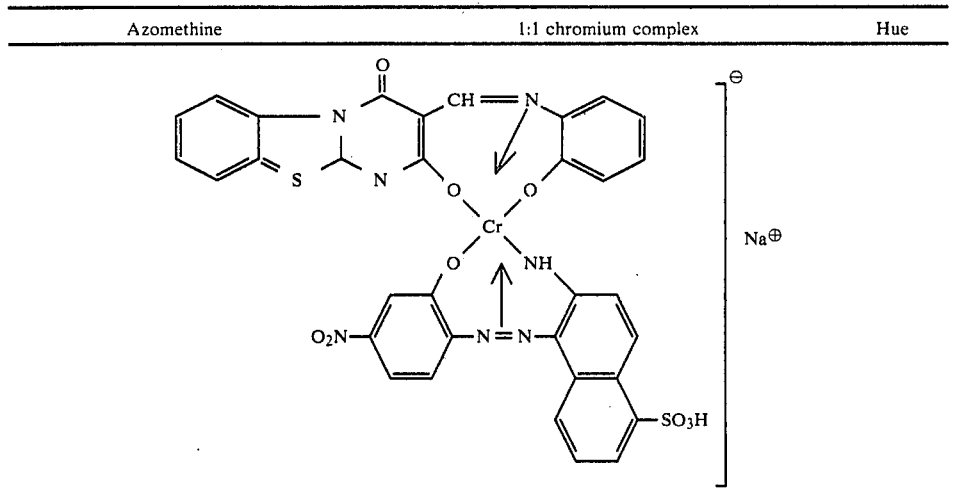 | |

EXAMPLE 7

12.3 parts of

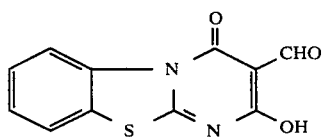

and 5.5 parts of o-aminophenol are stirred in an ethanol/water mixture at pH 7.5 for 30 minutes. 25 parts of the 1:1 chromium complex of the azo dye obtained from 1-amino-2-hydroxy-4-nitrobenzene and 2-naphthylamine-5-sulfonic acid are then added and the mixture is stirred for 8 hours at 80° C. The dye is isolated by evaporation. Yield, 37 parts. The dye gives a green hue on wool and nylon.

Red or orange dyes are obtained by using the 1:1 chromium complexes of the azo dyes obtained from 1-amino-2-naphthol-4-sulfonic acid and 1-(3'-sulfophenyl)-3-methylpyrazol-5-one, or from 1-amino-2-hydroxy-5-nitrobenzene-3-sulfonic acid and 1-phenyl-3-methylpyrazol-5-one.

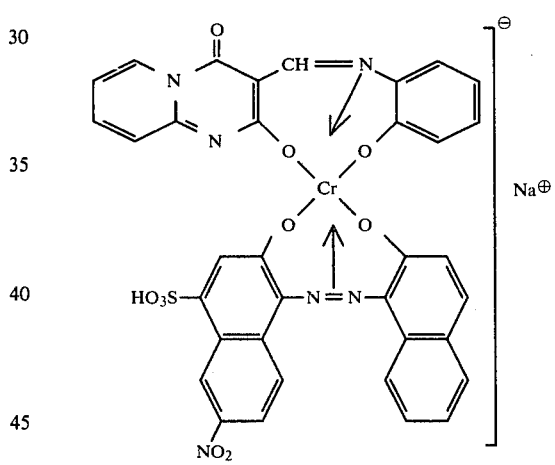

9.5 parts of the aldehyde of the formula

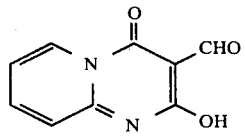

are suspended in 300 ml of water at 70° C. 5.5 parts of o-aminophenol are added, the pH being brought to 7.5 by adding sodium hydroxide solution. 25 parts of the 1:1 chromium complex of the azo dye obtained from 1-amino-2-hydroxy-4-sulfo-6-nitro-naphthalene and β-naphthol are then added and the formation of the 1:2 chromium complex is completed at pH 8 and 80° C. The mixture is evaporated under reduced pressure and 39 parts of a dark powder, which gives black dyeings on wool and nylon, are obtained.

The metal complex dyes shown below are obtained by similar methods.

| Azomethine | 1:1 chromium complex | Hue |
|---|---|---|
| [pyridine-N fused ring with C=O, CH=N-C₂H₄-OH, OH, N] | [OH, H₂N, O₂N-phenyl-N=N-naphthyl-SO₃H] | green |
| " | [HO₃S-naphthyl(OH)-N=N-naphthyl(OH)] | blue |
| " | [HO₃S-naphthyl(OH)-N=N-naphthyl(OH)-SO₃H] | blue |
| " | [HO₃S, OH, NO₂-phenyl-N=N-pyrazolone(OH, N-phenyl, CH₃)] | orange |
| [pyridine-N fused ring with C=O, CH=N-phenyl-OH, OH, N] | [OH, H₂N, O₂N-phenyl-N=N-naphthyl-SO₃H] | olive |
| " | [HO₃S-naphthyl(OH)-N=N-pyrazolone(OH, N-phenyl-SO₃H, CH₃)] | red |
| " | [HO₃S, OH, NO₂-phenyl-N=CH-phenyl-OH] | yellow |

| Azomethine | 1:1 chromium complex | Hue |
|---|---|---|
| (structure) | (structure) | greyish blue |

EXAMPLE 8

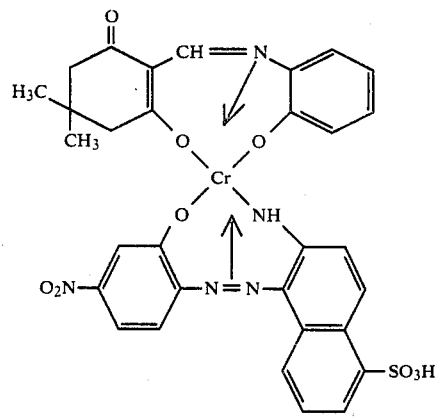

12.2 parts of

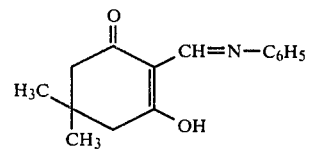

and 5.5 parts of o-aminophenol are stirred in 200 parts of water at pH 10 and 70° C. for 30 minutes. 25 parts of the 1:1 chromium complex of the azo dye obtained from 1-amino-2-hydroxy-4-nitrobenzene and 2-naphthylamine-5-sulfonic acid are added and the mixture is stirred for one hour at pH 9 and 80° C. The dye is precipitated by adding sodium chloride solution (yield: 40 g). It gives green dyeings on wool and nylon.

The following were obtained by a similar method:

| Azomethine | 1:1 chromium complex | Hue |
|---|---|---|
| (structure) | (structure) | yellow |
| " | (structure) | blue |
| " | (structure) | blue |
| (structure) | (structure) | red |

-continued

| Azomethine | 1:1 chromium complex | Hue |
|---|---|---|
| " | [structure: HO₃S, OH, HO, N=N, N-phenyl, N, CH₃, O₂N on benzene] | orange |
| " | [structure: HO₃S-naphthol-N=N-naphthol with NO₂ and OH groups] | grey |
| [structure: dimedone-CH=N-C₂H₄-OH with HO] | [structure: HO₃S-naphthol-N=N-naphthol, OH, HO] | blue |
| [structure: dimedone-CH=N-CH₂-COOH with HO] | [structure: HO₃S-naphthol-N=N-naphthol, OH, HO] | blue |
| " | [structure: HO₃S-naphthol-N=N-naphthol-SO₃H, OH, HO] | blue |
| " | [structure: HO₃S, OH, HO, N=N, CH₃, CONHC₆H₅, NO₂ on benzene] | yellow |

EXAMPLE 9

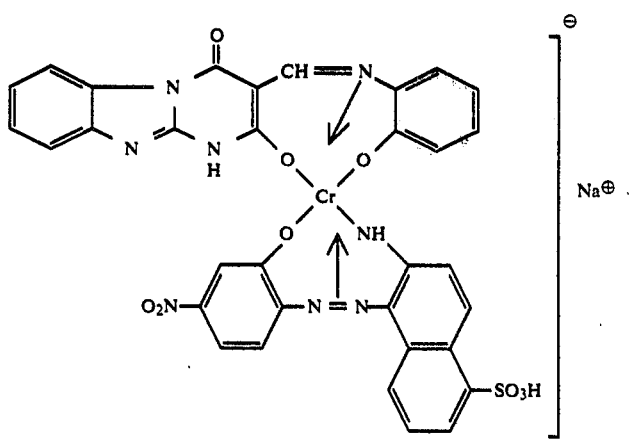

7.5 parts of the anil of the formula

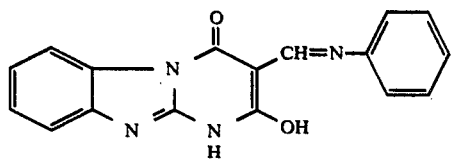

and 3 parts of o-aminophenol in 100 parts of ethanol and 300 parts of water are boiled for 30 minutes at pH 9-10.

12 parts of the 1:1 chromium complex of the azo dye obtained from 1-amino-2-hydroxy-4-nitrobenzene and 2-naphthylamine-5-sulfonic acid are then added and the pH is maintained at 9 by further dropwise addition of dilute sodium hydroxide solution. The 1:2 chromium complex dye is isolated by adding sodium chloride. After drying, 30 parts of a readily water-soluble powder are obtained, which gives green dyeings on wool and nylon.

The following dyes were obtained by a similar method:

| Azomethine | 1:1 chromium complex | Hue |
|---|---|---|
| (benzimidazole anil with OH) | naphthyl-azo-naphthyl, HO₃S, OH, HO | olive |
| " | naphthyl-azo-naphthyl, HO₃S, OH, HO, NO₂ | greyish green |
| " | naphthyl-azo- with phenyl-N=N, HO₃S, OH, HO, CH₃, SO₃H | red |

| Azomethine | 1:1 chromium complex | Hue |
|---|---|---|
| " | 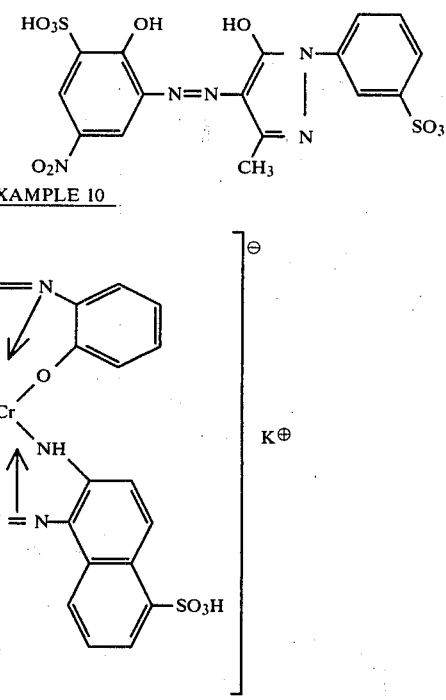 | orange |

EXAMPLE 10

11.4 parts of

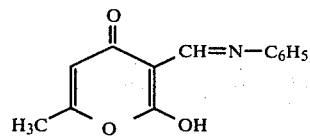

and 5.5 parts of o-aminophenol in 200 parts of water are stirred for 30 minutes at 80° C. and pH 9.2, so as to give a clear solution. The 1:2 chromium complex is formed by adding 25 parts of the 1:1 chromium complex of the azo dye obtained from 1-amino-2-hydroxy-4-nitrobenzene and 2-naphthylamine-5-sulfonic acid. Yield, 36 parts. The product gives green dyeings on wool and nylon.

The following dyes were prepared by a similar method:

| Azomethine | 1:1 chromium complex | Hue |
|---|---|---|
| 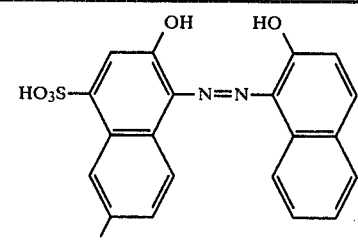 | 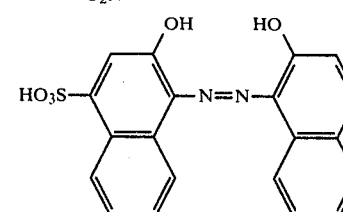 | grey |
| " |  | grey |

-continued

| Azomethine | 1:1 chromium complex | Hue |
|---|---|---|
| " | | red |
| " | | orange |
| " | | brownish olive |
| | | green |
| " | | yellow |

EXAMPLE 11

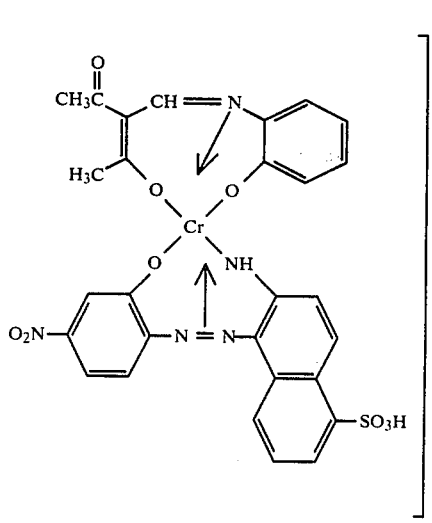

10.5 parts of the anil of the formula

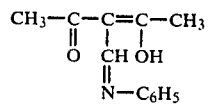

and 5.5 parts of o-aminophenol in 200 parts of water are stirred for 30 minutes at 70° C. and pH 9.5. 23 parts of the 1:1 chromium complex of the azo dye obtained from 1-amino-2-hydroxy-4-nitrobenzene and 2-naphthylamine-5-sulfonic acid are then added. The product is isolated by adding 80 parts of potassium chloride. 34 parts of a green dye are obtained.

The following complex dyes were prepared by a similar method:

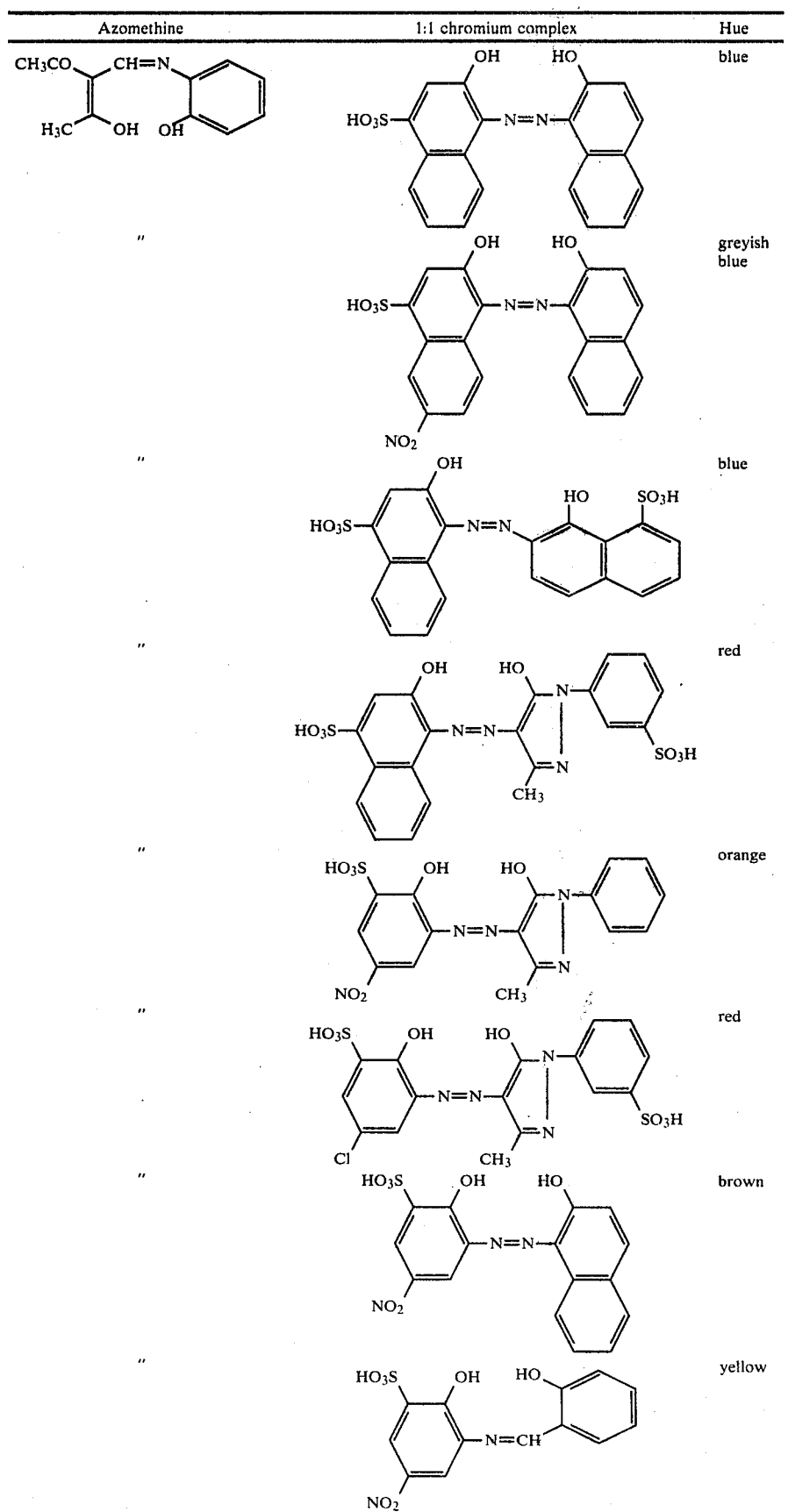

| -continued | | |
|---|---|---|
| Azomethine | 1:1 chromium complex | Hue |
| " | 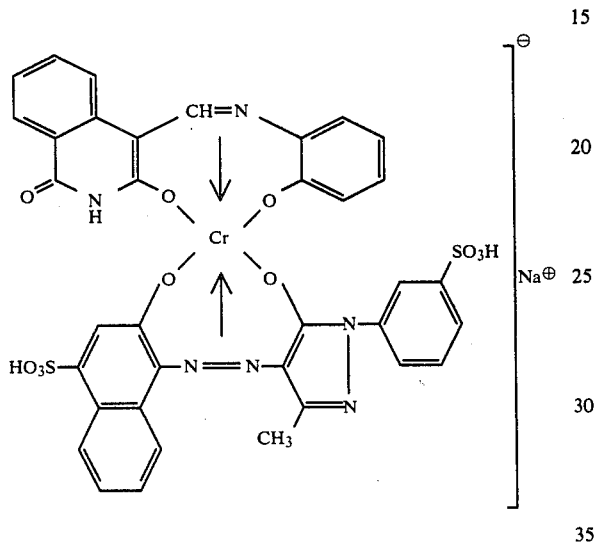 | yellow |

EXAMPLE 12

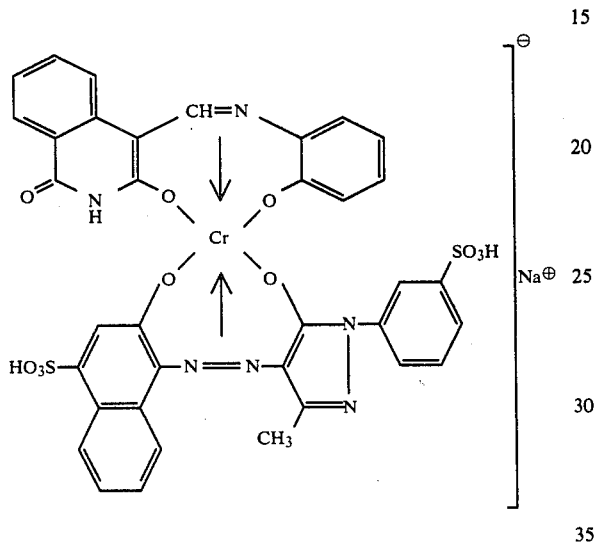

10.1 parts of

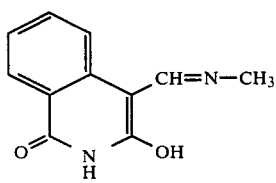

are suspended in 300 parts of water and 100 parts of ethanol at 80° C. and pH 10. 5.5 parts of o-aminophenol are then added followed by 27 parts of the 1:1 chromium complex of the azo dye obtained from 1-amino-2-naphthol-4-sulfonic acid and 1-(3'-sulfophenyl)-3-methyl-pyrazol-5-one.

The formation of the complex is complete after stirring for 8 hours. The product is isolated by salting out with sodium chloride solution. Yield 40 g. The product gives red dyeings on wool and nylon.

EXAMPLE 13

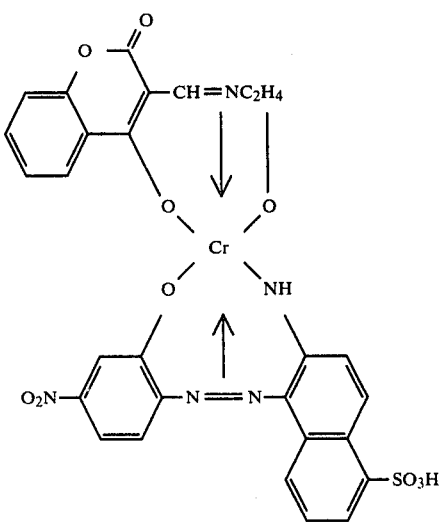

13.5 parts of

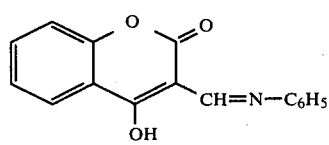

and 3.2 parts of aminoethanol in 200 parts of water are stirred for 30 minutes at 50° C. 25 parts of the 1:1 chromium complex of the azo dye obtained from 1-amino-2-hydroxy-4-nitrobenzene and 2-naphthylamine-5-sulfonic acid are then added and the mixture is stirred for 6 hours at 70°–80° C. The dye is precipitated by sprinkling 150 parts of sodium chloride into the mixture. 54 parts of a readily water-soluble powder are obtained, which gives green dyeings on wool and nylon.

The following dyes were obtained by a similar method:

| Azomethine | 1:1 chromium complex | Hue |
|---|---|---|
| 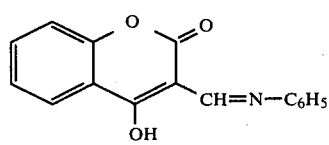 | 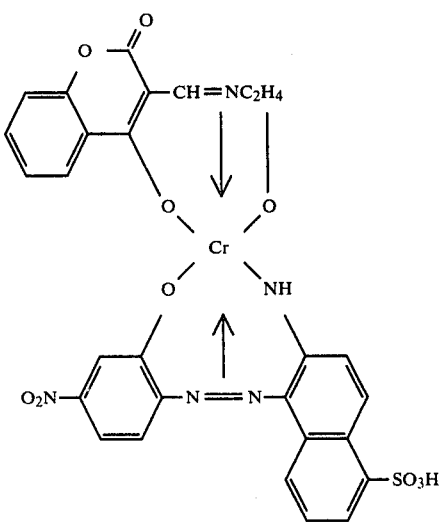 | blue |

| Azomethine | 1:1 chromium complex | Hue |
|---|---|---|
| " |  | blue |
| " | 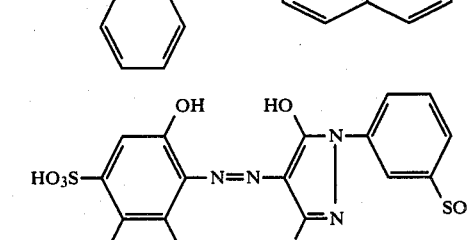 | red |
| " | 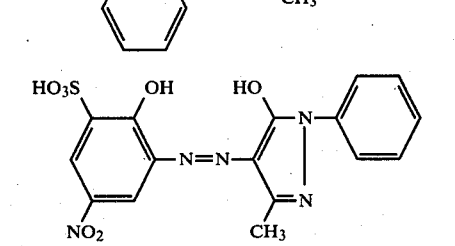 | orange |
| " | 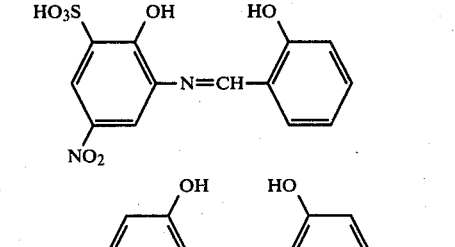 | yellow |
| 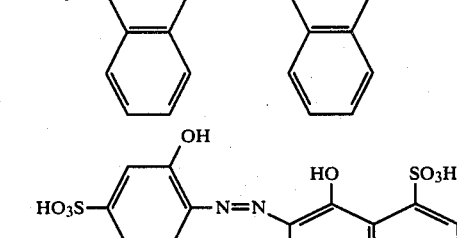 | 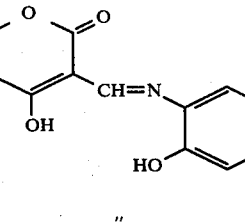 | grey |
| " | 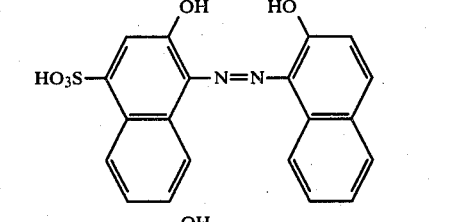 | dark green |
| " | 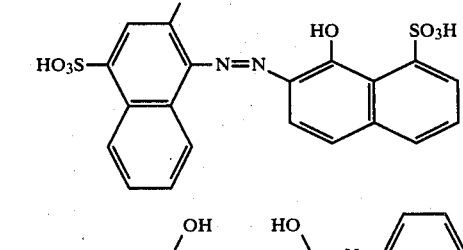 | red |
| " | 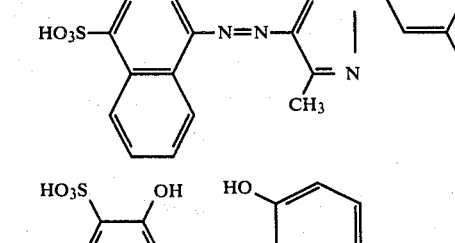 | yellow |

| Azomethine | 1:1 chromium complex | Hue |
|---|---|---|
| " | 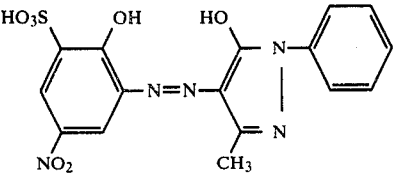 | orange |
| " | 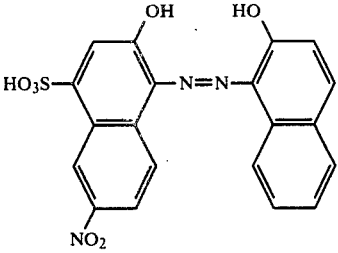 | grey |
| " | 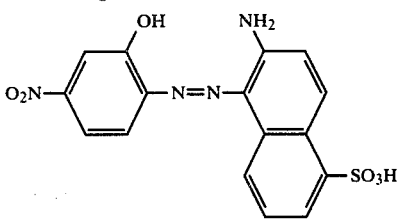 | green |
| 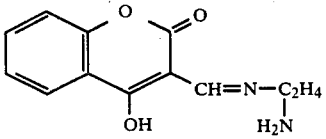 | 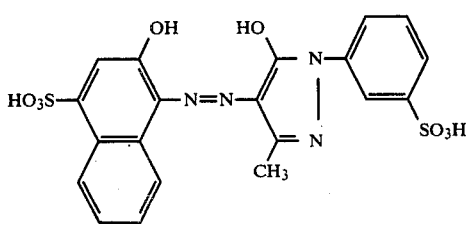 | red |
| 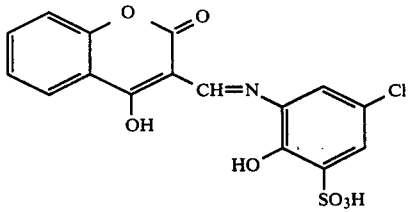 | " | " |
| 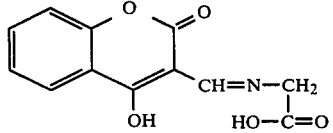 | " | " |
| " | 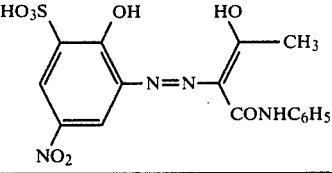 | yellow |

EXAMPLE 14

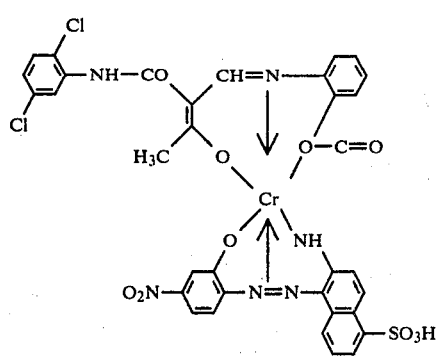

20 parts of the azomethine of the formula

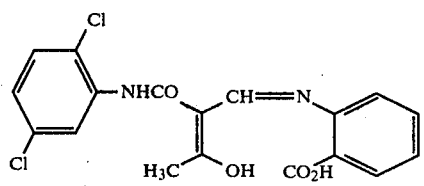

and 25 parts of the 1:1 chromium complex of the azo dye obtained from 1-amino-2-hydroxy-4-nitrobenzene and 2-naphthylamine-5-sulfonic acid, in 500 parts of water, are heated at 70° C. The pH is brought to 7.5 with dilute sodium hydroxide solution and is maintained for five hours. A further 200 parts of N-methylpyrrolidone are added and the mixture is then stirred for 6 hours. After filtering, the dye is precipitated by adding 250 parts of sodium chloride. After drying, 75 parts of a dark powder, which gives green dyeings on wool and nylon, are obtained.

EXAMPLE 15

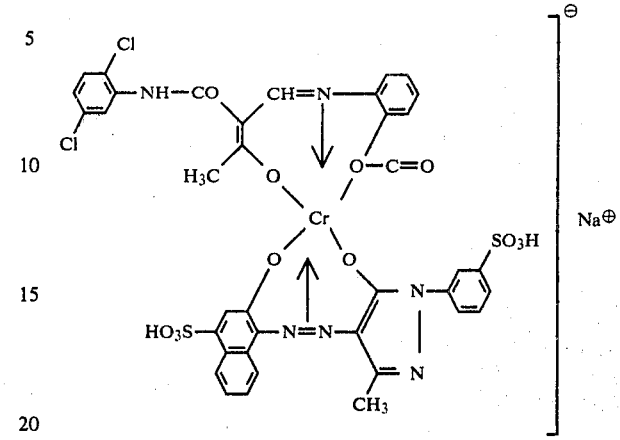

20 parts of the azomethine of the formula

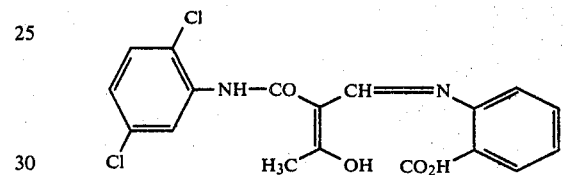

are dissolved in 100 parts of N-methylpyrrolidone. A suspension of 27 parts of the 1:1 chromium complex of the azo dye obtained from 1-amino-2-naphthol-4-sulfonic acid and 1-(3'-sulfophenyl)-3-methylpyrazol-5-one in 300 parts of water are run in. The pH is brought to 7.5 with dilute sodium hydroxide solution and the mixture is stirred for 3.5 hours at 70° C. The reaction batch is filtered and 2,000 parts of water, 1,000 parts of saturated sodium chloride solution and 250 parts of sodium chloride are added to the filtrate. The dye is filtered off. Yield, 48 parts. The product gives red dyeings on wool and nylon.

EXAMPLE 16

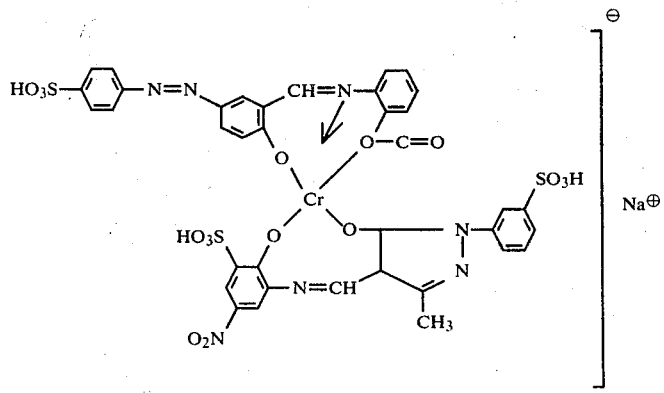

68.5 parts of 5-phenylazo-2-hydroxybenzaldehyde-4'-sulfonic acid and 28 parts of anthranilic acid are stirred into 1,000 parts of water at 40° C. 170 parts of the 1:1 chromium complex of the azomethine obtained from 1-amino-2-hydroxy-5-nitrobenzene-3-sulfonic acid and 1-(3'-sulfophenyl)-3-methyl-4-formyl-pyrazol-5-one are then added, whilst bringing the pH to 7 by means of 14.4 parts of sodium hydroxide dissolved in water. The mixture is stirred for 5 hours at 70° C. and the dye is precipitated by adding 500 parts of sodium chloride. After drying, 259 parts of a readily water-soluble powder, which gives yellow dyeings on wool and nylon, are obtained.

EXAMPLE 17

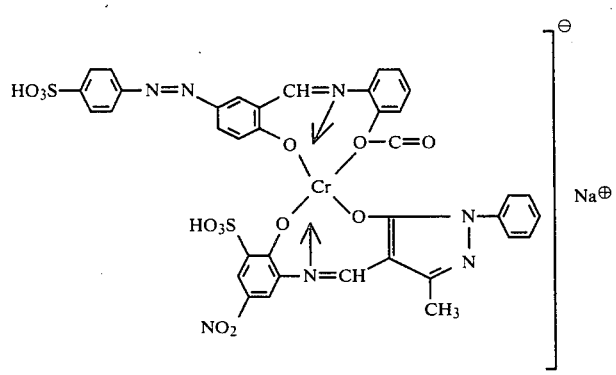

50 parts of the azomethine of the formula

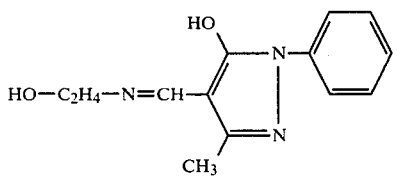

and 47 parts of 1-amino-2-hydroxy-5-nitrobenzene-3-sulfonic acid in 200 parts of water are refluxed with 41 parts of chromium formate dissolved in 100 parts of 50% formic acid for 4.5 hours. 10 parts of formic acid are added and the mixture is boiled for a further 7 hours, after which the formation of the 1:1 complex is complete. The mixture is diluted with 200 parts of water and the product is filtered off, yield, 102 parts.

76.5 parts of the above 1:1 chromium complex, 21 parts of anthranilic acid and 42 parts of 5-phenylazo-2-hydroxybenzaldehyde-4'-sulfonic acid in 800 parts of water are brought to pH 7.5 with dilute sodium hydroxide solution. After stirring for 7 hours, the formation of the 1:2 chromium complex is complete. 200 parts of sodium chloride are added and after drying 161 parts of a dye which gives very fast yellow dyeings on wool and nylon are obtained.

EXAMPLE 18

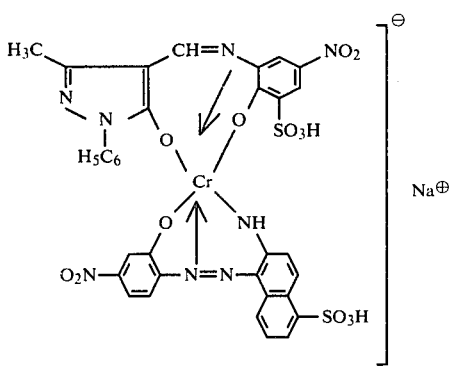

12.5 parts of the azomethine of the formula

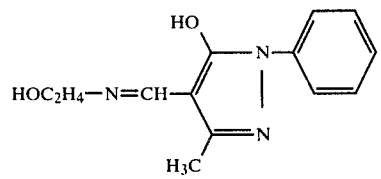

and 12 parts of 1-amino-2-hydroxy-5-nitrobenzene-3-sulfonic acid are stirred into 200 parts of water. 25 parts of the 1:1 chromium complex of the azo dye obtained from 1-amino-2-hydroxy-4-nitrobenzene and 2-naphthylamine-5-, sulfonic acid are added and the mixture is heated at 70° C. and brought to pH 7.5 by adding sodium hydroxide solution. Under these conditions, the formation of the complex is complete in 6 hours. The product is precipitated with 150 parts of sodium chloride. Yield, 54 parts. The green dyeings obtained on wool and nylon are very fast to light.

EXAMPLE 19

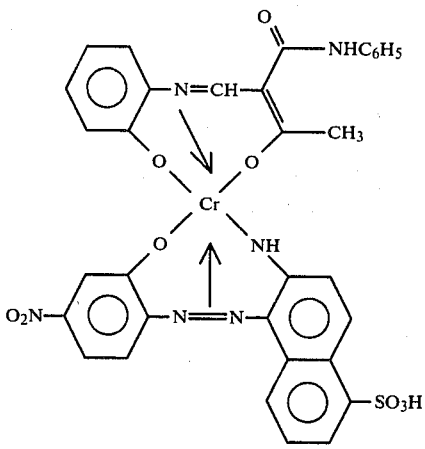

43.6 parts of o-aminophenol, 70.8 parts of acetoacetic acid anilide and 74 parts of triethyl orthoformate in 50 parts of N-methylpyrrolidone are boiled for 6.5 hours at 110° C. After the mixture has cooled, it is diluted with 500 parts of ethanol and poured into two liters of water. 60 parts of the azomethine compound

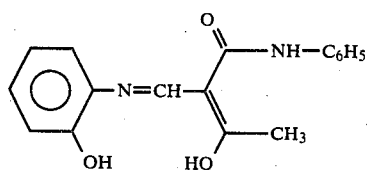

which melts at 165°–166° C., are obtained.

15 parts of azomethine and 25 parts of the 1:1 chromium complex of the azo dye obtained from 1-amino-2-hydroxy-4-nitrobenzene and 2-naphthylamine-5-sulfonic acid, in 500 parts of water, are heated at 70° C., whilst maintaining the pH at 7.5 with 0.05-molar NaOH solution, until—according to chromatographic analysis—the reaction is complete. 250 parts of sodium chloride are sprinkled into the mixture and the dye is filtered off.

Yield, 48 parts. On wool and nylon, the product gives green dyeings of great lightfastness and wetfastness.

We claim:

1. A dye which in the form of the free acid corresponds to the formula

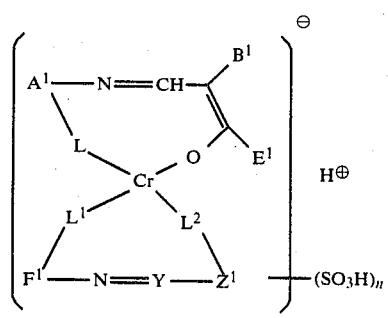

where

-continued $A^1$ is 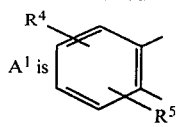

or —(CH$_2$)$_m$—, m is 1, 2 or 3, $R^4$ is hydrogen, chlorine, nitro, methyl or hydroxysulfonyl, $R^5$ is hydrogen or chlorine,

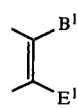

or the radical of acetylacetone, of an acetoacetoanilide which is unsubstituted or substituted in the phenyl ring by chlorine, methyl, methoxy or hydroxysulfonyl, of a 1-phenyl-3-methylpyrazol-5-one which is unsubstituted or substituted in the phenyl ring by chlorine, methyl or hydroxysulfonyl, of a barbituric acid which is N-unsubstituted or is N-monosubstituted or N,N'-disubstituted by alkyl of 1 to 4 carbon atoms or by phenyl, or of a 2,4-dihydroxyquinoline which is unsubstituted or substituted at the nitrogen by alkyl of 1 to 4 carbon atoms, $F^1$ is

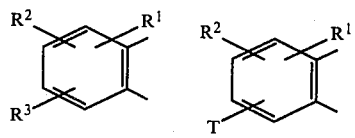

or —(CH$_2$)$_n$—

$R^1$ is hydrogen, chlorine, bromine, nitro, hydroxysulfonyl, aminosulfonyl, alkylaminosulfonyl, where alkyl is of 1 to 4 carbon atoms, dialkylaminosulfonyl, where alkyl is of 1 to 4 carbon atoms, methyl, ethyl, methoxy or ethoxy, $R^2$ is hydrogen, chlorine or methyl, or $R^1$ and $R^2$ together may be a fused benzo-ring which is unsubstituted or substituted by hydroxysulfonyl, chlorine or nitro, $R^3$ is hydrogen or hydroxysulfonyl, n is 1, 2, 3 or 4, T is hydrogen, chlorine, bromine, nitro, hydroxysulfonyl or phenylazo which is unsubstituted or substituted by chlorine, bromine, methyl, methoxy, hydroxyl or hydroxysulfonyl;

L, L$^1$ and L$^2$ are the same or different substituents selected from the group consisting of —O—, —COO—,

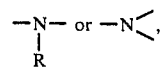

$Z^1$ is a radical of the formula

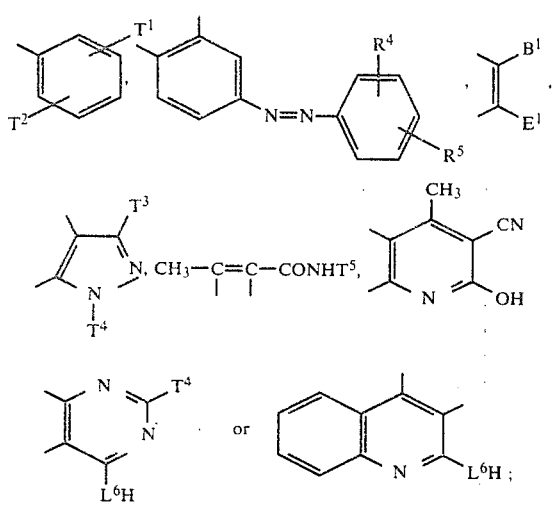

L⁶ is —O— or —NH—,

T¹ is hydrogen, methyl, methoxy or ethoxy,

T² is hydrogen or methyl, or

T¹ and T² together are a fused benzo-ring which is unsubstituted or substituted by hydroxysulfonyl, amino or hydroxyl, T³ is methyl, alkoxycarbonyl of 1 to 4 carbon atoms or carbamyl, T⁴ is methyl or is phenyl which is unsubstituted or substituted by methyl, chlorine or hydroxysulfonyl, T⁵ is benzyl or is phenyl which is unsubstituted or substituted by chlorine, bromine, methyl, ethyl, methoxy, ethoxy, hydroxysulfonyl or carbamoyl;

Y is =CH— or =N— and

R is hydrogen, alkyl of 1 to 6 carbon atoms, hydroxyethyl, hydroxypropyl, alkoxyethyl or alkoxypropyl, where alkoxy is of 2 to 4 carbon atoms, phenoxyethyl or phenoxypropyl, alkanoyloxyethyl or alkanoyloxypropyl, where alkanoyl is of 2 to 4 carbon atoms, benzoyloxyethyl or benzoyloxypropyl, phenylsulfonyloxyethyl or phenylsulfonyloxypropyl, tolylsulfonyloxyethyl or tolylsulfonyloxypropyl, cyclohexyl, benzyl or phenylethyl, or is phenyl which is unsubstituted or substituted by chlorine, bromine, methyl, ethyl, methoxy, ethoxy or hydroxysulfonyl;

B¹ is selected from the group consisting of cyano, acyl, substituted sulfonyl, carboxylic acid ester and carboxyamide, E¹ is an aliphatic or carbocyclic radical or B¹ and E¹ taken together may form an alicylic or heterocyclic radical.

2. A dye as claimed in claim 1, wherein Z¹ is a radical of the formula

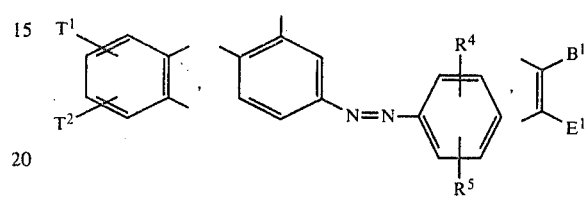

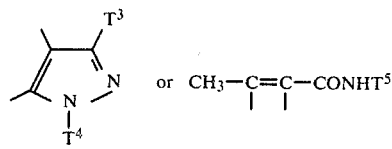

and B¹, E¹, R⁴, R⁵ and T¹ to T⁵ have the meanings given in claim 1.

3. A dye as claimed in claim 1, where

R is alkyl of 1 to 4 carbon atoms, β-hydroxyethyl or cyclohexyl or is phenyl which is unsubstituted or substituted by chlorine, methyl, methoxy or hydroxysulfonyl.

4. The compound of the formula

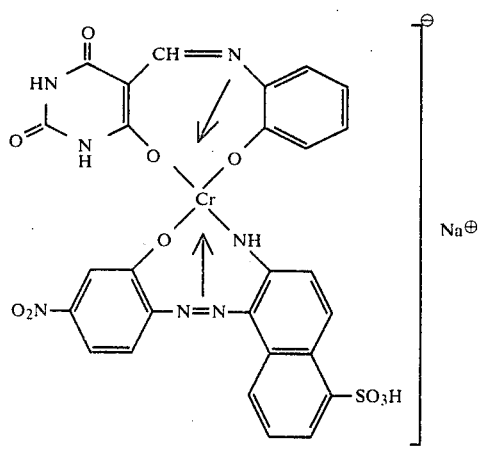

5. The compound of the formula

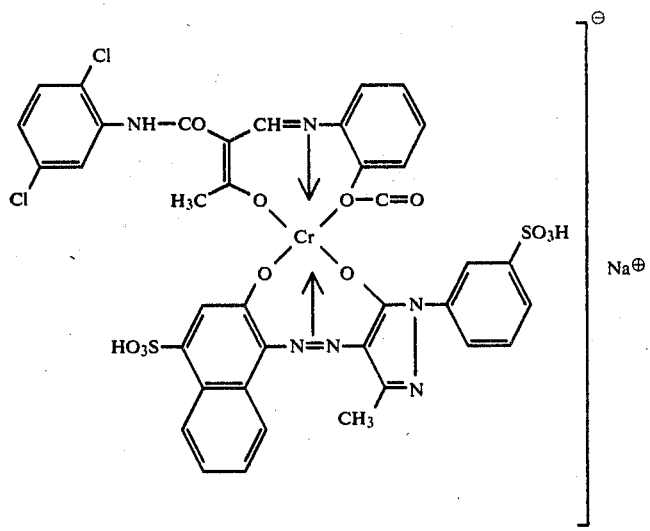
6. The compound of the formula
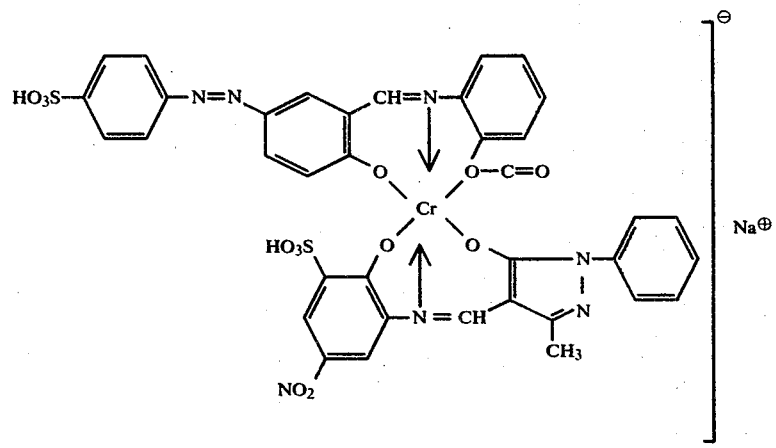
7. The compound of the formula
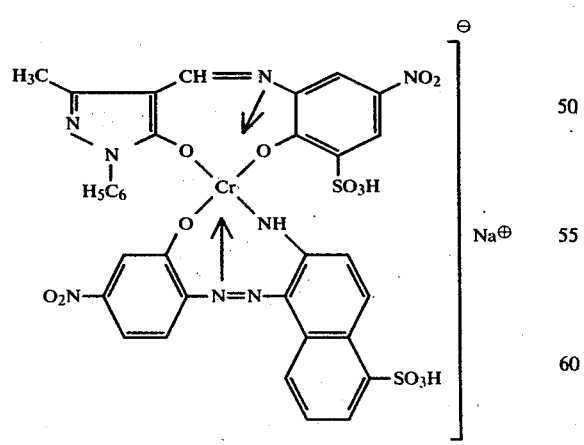
8. The compound of the formula
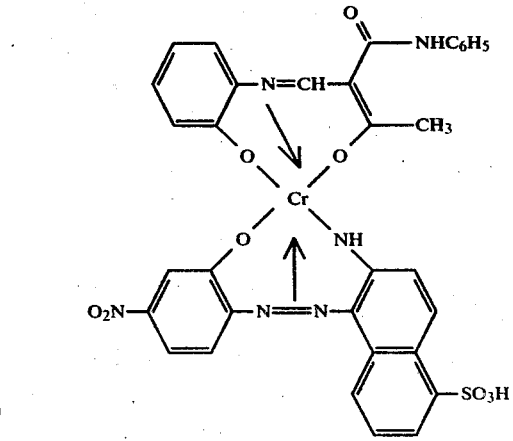
9. The dyes of claim 1, wherein $L^1$ is —O— or —CO— and $L^2$ is —O— or —NH—.
* * * * *